United States Patent
Dou et al.

(10) Patent No.: US 9,882,636 B2
(45) Date of Patent: Jan. 30, 2018

(54) MONITORING APPARATUS FOR AN OPTICAL SIGNAL TO NOISE RATIO, SIGNAL TRANSMISSION APPARATUS AND RECEIVER

(71) Applicant: FUJITSU LIMITED, Kawasaki (JP)

(72) Inventors: Liang Dou, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/074,374

(22) Filed: Mar. 18, 2016

(65) Prior Publication Data
US 2016/0277105 A1   Sep. 22, 2016

(30) Foreign Application Priority Data
Mar. 18, 2015   (CN) .......................... 2015 1 0119183

(51) Int. Cl.
*H04B 10/077* (2013.01)
*H04L 5/00* (2006.01)

(52) U.S. Cl.
CPC ........ *H04B 10/0775* (2013.01); *H04L 5/0048* (2013.01)

(58) Field of Classification Search
CPC .............. H04B 10/0775; H04B 10/532; H04B 2210/075; H04J 14/06
See application file for complete search history.

(56) References Cited

U.S. PATENT DOCUMENTS

| | | | | |
|---|---|---|---|---|
| 6,396,051 B1 * | 5/2002 | Li | ...................... | G02B 6/29322 250/227.18 |
| 8,285,148 B2 * | 10/2012 | Haunstein | .............. | H04B 10/60 398/158 |
| 2009/0060494 A1 * | 3/2009 | Renner | .................. | H04B 10/50 398/9 |

(Continued)

FOREIGN PATENT DOCUMENTS

| | | | | |
|---|---|---|---|---|
| CN | 101378292 | | 3/2009 | |
| CN | 102870353 | | 1/2013 | |
| WO | WO2015004390 A1 * | | 1/2015 | ........... H05B 10/077 |

OTHER PUBLICATIONS

Chinese Office Action dated Dec. 8, 2017 in Chinese Patent Application No. 201510119183.3.

*Primary Examiner* — David Payne
*Assistant Examiner* — Casey Kretzer
(74) *Attorney, Agent, or Firm* — Staas & Halsey LLP (57) ABSTRACT

Embodiments of the present disclosure provide a monitoring apparatus for an optical signal to noise ratio, a signal transmission apparatus and a receiver. The monitoring apparatus includes a selecting unit configured to select a time domain, and/or frequency domain range for calculating noise power of received signals according to a location of a pilot signal in the received signals in a time domain and/or frequency domain, and a calculating unit configured to calculate the noise power of the received signals according to the received signals in the selected range of the time domain and/or frequency domain, and calculate an optical signal to noise ratio of the received signals according to the noise power. The optical signal to noise ratio may be accurately estimated, with a process of calculation being simple and a scope of application being relatively wide.

4 Claims, 6 Drawing Sheets

(56) References Cited

U.S. PATENT DOCUMENTS

2009/0324219 A1* 12/2009 Jiang ................... H04J 14/0221
398/34
2011/0255870 A1    10/2011 Grigoryan et al.
2011/0274442 A1    11/2011 Zhang et al.
2016/0142134 A1*   5/2016 Pincemin ........... H04B 10/0775
398/26

* cited by examiner

MONITORING APPARATUS FOR AN OPTICAL SIGNAL TO NOISE RATIO, SIGNAL TRANSMISSION APPARATUS AND RECEIVER

CROSS-REFERENCE TO RELATED APPLICATIONS

This application claims the priority benefit of Chinese Patent Application No. 201510119183.3, filed on Mar. 18, 2015 in the Chinese State Intellectual Property Office, the disclosure of which is incorporated herein in its entirety by reference.

BACKGROUND

1. Field

The present disclosure relates to the field of communications, and in particular to a monitoring apparatus for an optical signal to noise ratio, a signal transmission apparatus and a receiver.

2. Description of the Related Art

No matter in a conventional direct detection optical communication system or in a coherent optical communication system, an optical signal to noise ratio (OSNR) is an amount directly associated with the system performance. Hence, attention has widely been paid to the studies of technologies of monitoring the optical signal to noise ratio.

A conventional measurement method based on a definition of OSNR relies on such conditions as that a noise power spectrum is flat, and a section of frequency band containing only noise but no signal exists in the spectrum, etc. With the increase of a capacity of optical communication, a transmission distance and a transmission rate of the coherent optical communication system are greatly increased than before. More optical nodes will result in more fluctuation of spectral shapes of a noise, and the assumption that optical noises are uniformly distributed in a spectrum is facing more challenges. And at the same time, as channel intervals are greatly reduced, finding a frequency band where signals may be neglected to measure noise power becomes an impractical subject. Hence, measurement of an OSNR in a coherent communication system becomes a now hot spot of studies.

In a practical communication system, besides noises in a transmission link itself, noises introduced due to a nonlinear effect are also contained. Wherein, the noises include a noise introduced due to an intra-channel nonlinear effect and a noise introduced due to an inter-channel nonlinear effect. In practical OSNR monitoring, if the noise introduced due to the nonlinear effect cannot be excluded, an estimation value of an OSNR will be lowered. In order to alleviate interference of the nonlinear noises on the estimation value of the OSNR, an existing method is to perform nonlinear compensation on received signals at a receiver end.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

When the above existing method is used to perform nonlinear compensation on received signals at a receiver end, operations are complex and a scope of application is relatively narrow, as the nonlinear compensation algorithm needs a method based on link reverse to solve a nonlinear Schrödinger equation.

Embodiments of the present disclosure provide a monitoring apparatus for an optical signal to noise ratio, a signal transmission apparatus and a receiver, in which a time domain and/or frequency domain range for calculating noise power is selected according to a location of a pilot signal in the received signals, and the optical signal to noise ratio may be accurately estimated, with a process of calculation being simple and a scope of application being relatively wide.

According to a first aspect of embodiments of the present disclosure, there is provided a monitoring apparatus for an optical signal to noise ratio, including: a selecting unit configured to select a time domain and/or frequency domain range for calculating noise power of received signals according to a location of a pilot signal in the received signals in a time domain and/or frequency domain; and a calculating unit configured to calculate the noise power of the received signals according to the received signals in the selected range of the time domain and/or frequency domain, and calculate an optical signal to noise ratio of the received signals according to the noise power.

According to a second aspect of embodiments of the present disclosure, there is provided a signal transmission apparatus, including: a transmitting unit configured to respectively transmit signals in two polarization states; wherein in transmitting each frame of signals, within a time period for transmitting a pilot signal in one polarization state, no signal is transmitted or a direct current optical signal is transmitted in the other polarization state.

According to a third aspect of embodiments of the present disclosure, there is provided a receiver, including the monitoring apparatus for an optical signal to noise ratio as described in the first aspect of embodiments of the present disclosure.

An advantage of embodiments of the present disclosure exists in that a time domain and/or frequency domain range for calculating noise power is selected according to a location of a pilot signal in the received signals, and the optical signal to noise ratio may be accurately estimated, with a process of calculation being simple and a scope of application being relatively wide.

With reference to the following description and drawings, the particular embodiments of the present disclosure are disclosed in detail, and the principle of the present disclosure and the manners of use are indicated. It should be understood that the scope of embodiments of the present disclosure is not limited thereto. Embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/includes" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of the present disclosure only, and a person of ordinary skill in the art may further obtain other drawings according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiment 1

Figure 1:
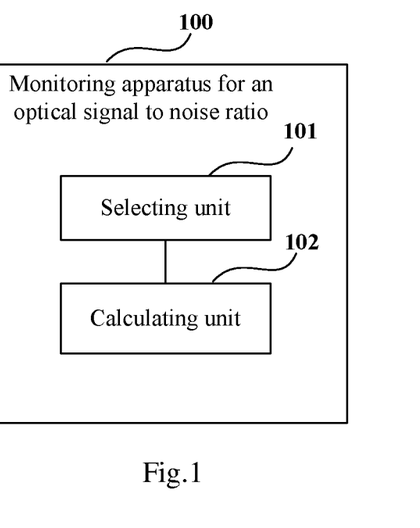
FIG. 1 is a schematic diagram of a structure of the monitoring apparatus for an optical signal to noise ratio according to Embodiment 1 of the present disclosure.

An embodiment of the present disclosure provides a monitoring apparatus for an optical signal to noise ratio, which may be applicable to a receiver end of a communication system. FIG. 1 is a schematic diagram of a structure of the monitoring apparatus for an optical signal to noise ratio according to Embodiment 1 of the present disclosure. As shown in FIG. 1, the apparatus 100 includes: a selecting unit 101 and a calculating unit 102.

The selecting unit 101 is configured to select a time domain and/or frequency domain range for calculating noise power of received signals according to a location of a pilot signal in the received signals in a time domain and/or frequency domain, and the calculating unit 102 is configured to calculate the noise power of the received signals according to the received signals in the selected range of the time domain and/or frequency domain, and calculate an optical signal to noise ratio of the received signals according to the noise power.

It can be seen from the above embodiment that the time domain and/or frequency domain range for calculating the noise power is selected according to the location of the pilot signal in the received signals, and the optical signal to noise ratio may be accurately estimated, with a process of calculation being simple and a scope of application being relatively wide.

In this embodiment, the received signals refer to transmission signals transmitted from a transmitter end and received at a receiver end after passing through an optical fiber transmission link in an optical communication system. As a pilot signal (or pilot signals) is (are) interpolated into the transmission signals, the pilot signal (or the pilot signals) is (are) also contained in the received signals.

In this embodiment, the pilot signals interpolated into the transmission signals may be a pilot signal sequence constituted by positive and negative signals in a staggered manner, and may also be pilot signals of different transmission power in the two polarization states, and a transmission manner of the pilot signals are not limited in embodiments of the present disclosure.

For example, pilot signals of different frequencies may be transmitted in the two polarization states respectively. For example, signals are transmitted in the two polarization states respectively, and in transmitting each frame of signals, within a time period for transmitting a pilot signal in one polarization state, no signal is transmitted or a direct current optical signal is transmitted in the other polarization state. By transmitting signals in this manner, most nonlinear crosstalk may be suppressed, thereby effectively eliminating influence of nonlinear crosstalk on calculation of noise power, and improving accuracy of calculating the optical signal to noise ratio.

In this embodiment, description is given taking transmitting pilot signals of different frequencies in the H polarization state and the V polarization state as an example; however, embodiments of the present disclosure are not limited to a dual-polarization-state system.

Figure 2:
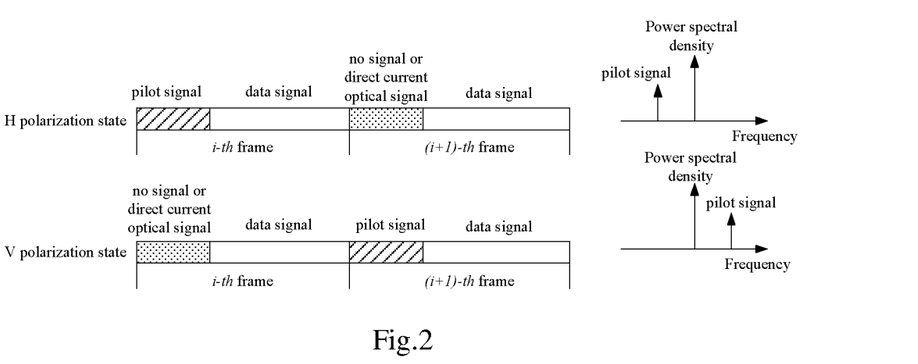
FIG. 2 is a sequence diagram of transmission signals and a corresponding frequency spectrogram according to Embodiment 1 of the present disclosure.

FIG. 2 is a sequence diagram of transmission signals and a corresponding frequency spectrogram according to Embodiment 1 of the present disclosure. As shown in FIG. 2, the transmission signals include pilot signals and data signals. The data signals are data that are actually transmitted, and are also referred to as payload data. In transmitting signals of an i-th frame, a pilot signal is transmitted in the H polarization state, and within a time period for transmitting the pilot signal, no signal is transmitted or a direct current optical signal is transmitted in the V polarization state; and in transmitting signals of an (i+1)-th frame, a pilot signal of a frequency different from a frequency of the signal transmitted in the H polarization state is transmitted in the V polarization state, and within a time period for transmitting the pilot signal, no signal is transmitted or a direct current optical signal is transmitted in the H polarization state, i being a positive integer.

In this embodiment, the selecting unit 101 is configured to select the time domain and/or frequency domain range for calculating the noise power of the received signals according to the location of the pilot signal in the received signals in the time domain and/or frequency domain.

How to select the time domain range and frequency domain range for calculating the noise power according to a location of a pilot signal in the time domain and frequency domain shall be respectively illustrated below.

First, how to select the time domain range for calculating the noise power according to the location of the pilot signal in the time domain shall be illustrated.

In a communication system, after a signal is transmitted in a channel, due to influence of an intra-channel nonlinear effect, a time domain waveform u of the signal may be expressed by Formula (1) below:

$$u_H(t=kT, z=L) = u_H(t=kT, 0) + \sum_{m,n} [A_{m+k}^H A_{n+k}^H (A_{m+n+k}^H)^* + A_{m+k}^H A_{n+k}^V (A_{m+n+k}^V)^*] C(m, n, z=L)$$

$$u_V(t=kT, z=L) = u_V(t=kT, 0) + \sum_{m,n} [A_{m+k}^V A_{n+k}^V (A_{m+n+k}^V)^* + A_{m+k}^V A_{n+k}^H (A_{m+n+k}^H)^*] C(m, n, z=L);$$

(1)

where, $u_H$ (t=kT, z=L) denotes a time domain waveform of a signal in the H polarization state at a transmission distance of L at a kT-th moment, $u_V$ (t=kT, z=L) denotes a time domain waveform of the signal in the V polarization state at the transmission distance of L at the kT-th moment, $u_H$ (t=kT,0) denotes a time domain waveform of the signal in the H polarization state at a transmission distance of 0 at the kT-th moment, $u_V$ (t=kT, 0) denotes a time domain waveform of the signal in the V polarization state at the transmission distance of 0 at the kT-th moment, $A_{m+k}^H$, $A_{n+k}^H$ and $A_{m+n+k}^H$ denote respectively symbol information of pulses in the H polarization state at an (m+k)-th, (n+k)-th and (m+n+k)-th moments, $A_{m+k}^V$, $A_{n+k}^V$ and $A_{m+n+k}^V$ denote respectively symbol information of pulses in the V polarization state at the (m+k)-th, (n+k)-th and (m+n+k)-th moments, C(m,n,z=L) denotes a parameter related to a pulse shape and a link at the transmission distance of L, T is a pulse period, and z is a transmission distance, k, m and n being all integers.

According to above Formula (1), it was found by the inventors that from nonlinear noises experienced by the symbols in the H polarization state within a time period of the pilot signal, it can be seen that for the H polarization state, if times to which the three pulses at the (m+k)-th, (n+k)-th and (m+n+k)-th moments correspond are all within the time period of the pilot signal, i.e., all of m+k, n+k and m+n+k fall within the time period of the pilot signal, then the produced nonlinear noise have the same frequency as that of the pilot signal in the H polarization state, whichever the polarization state the pulses come from; and for the V polarization state, the case is similar, which shall not be described herein any further. In calculating the optical signal to noise ratio, the noise power is calculated based on spectrum to which the signals within the time period of the pilot signal corresponds. Hence, the intra-channel nonlinear effect will not contribute to frequency spots of a non-pilot signal, and therefore, it will not influence the measurement of the optical signal to noise ratio.

However, if any one of the three pulses at the above (m+k)-th, (n+k)-th and (m+n+k)-th moments does not fall within the time period of the pilot signal, spectrum of nonlinear noises in a corresponding channel will have a relatively large width, which will lead to enlarged estimation of the noise power in the calculation of the optical signal to noise ratio, thereby resulting in that the calculated optical signal to noise ratio is inaccurate.

In this embodiment, the selecting unit 101 may select a time domain range having a distance from a center of the pilot signal less than or equal to a first threshold value in the time domain and take it as the time domain range for calculating the noise power of the received signals. For example, the first threshold value may be determined according to an actual situation.

By selecting the time domain range near the center of the pilot signal and take it as the time domain range for calculating the noise power, influence of intra-channel nonlinear noises on the calculation of the noise power may be effectively eliminated, thereby improving accuracy of calculating the optical signal to noise ratio.

Figure 3:
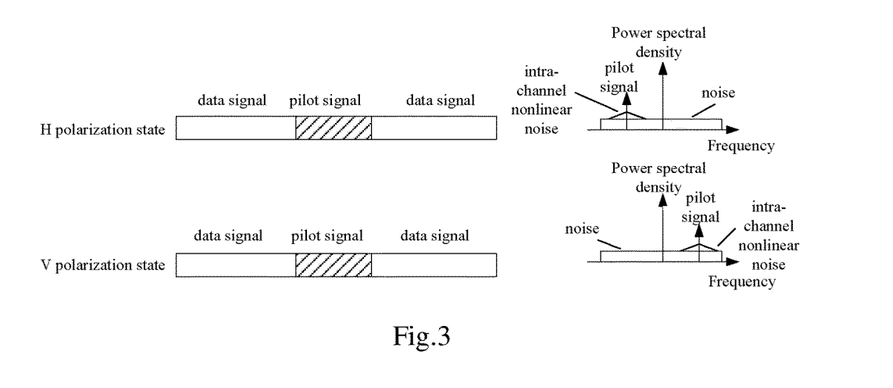
FIG. 3 is a sequence diagram of signals in the H polarization state and the V polarization state and corresponding frequency spectrogram.

FIG. 3 is a sequence diagram of signals in the H polarization state and the V polarization state and corresponding frequency spectrogram. As shown in FIG. 3, if any one of the three pulses at the above (m+k)-th, (n+k)-th and (m+n+k)-th moments does not fall within the time period of the pilot signal, spectrum of intra-channel nonlinear noise will have a relatively large width, i.e., they will no longer be single-frequency signals having the same frequency as the pilot signal, thereby resulting in enlarged estimation of the noise power in the calculation of the optical signal to noise ratio.

Figure 4:
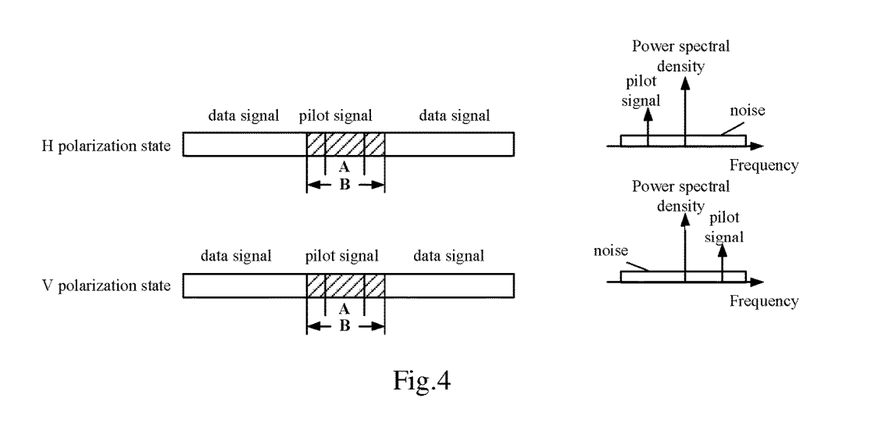
FIG. 4 is a sequence diagram of signals in the H polarization state and the V polarization state for which a time domain range is selected and corresponding frequency spectrogram according to Embodiment 1 of the present disclosure.

FIG. 4 is a sequence diagram of signals in the H polarization state and the V polarization state for which a time domain range is selected and corresponding frequency spectrogram according to Embodiment 1 of the present disclosure. As shown in FIG. 4, A denotes the selected time domain range near the center of the pilot signal, and B denotes a whole time domain range of the pilot signal; obviously, a size of the time domain range A is dependent on a size of a distance from the center of the pilot signal. By selecting the time domain range A as the time domain range for calculating the noise power of the received signals, the intra-channel nonlinear noises are still single-frequency signals having the same frequency as the pilot signal in the frequency domain, thereby eliminating the influence of the intra-channel nonlinear noises on the calculation of the noise power, and improving accuracy of calculating the optical signal to noise ratio.

In this embodiment, a ratio of the selected time domain range A to the whole time domain range B of the pilot signal may be determined according to an actual situation. For example, the ratio may be determined according to at least one of the number of used pilot signals, a size of dispersion in the received signals or a requirement on calculation precision. If the dispersion in the received signals is relatively small, the ratio may be set to be a relatively large value, i.e., the selected time domain range A is relatively wide.

For example, the ratio of the selected time domain range A to the whole time domain range B of the pilot signal may be 1/2; however, embodiments of the present disclosure are not limited thereto.

How to select the time domain range for calculating the noise power according to the location of the pilot signal in the time domain is illustrated above. And how to select the frequency domain range for calculating the noise power according to the location of the pilot signal in the frequency domain shall be illustrated below.

In a communication system, the inter-channel nonlinear effect is also referred to as cross-phase modulation (XPM), and nonlinear noises caused by the XPM effect are also divided into two types, i.e., nonlinear phase noises and nonlinear crosstalk. For the pilot signal in the H polarization state, spectra of the nonlinear phase noises are centralized near the spectrum of the pilot signal, and due to a low-pass filtering effect of the XPM, a range of the spectrum of the nonlinear phase noises is relatively centralized in a range of several GHzs. Hence, the nonlinear phase noises near the frequency of the pilot signal in the H polarization state result in that estimation of the noise power in the calculation of the optical signal to noise ratio is enlarged, thereby resulting in that the calculated optical signal to noise ratio is inaccurate.

And at the same time, the nonlinear crosstalk is an additive noise, which may be expressed by Formula (2) below:

$$C = u_{1V} \times u_{2H} \times \mathrm{conj}(u_{2V}) \quad (2);$$

where, the subscript 1 denotes an on-channel, the subscript 2 denotes a neighboring channel, $u_{1V}$ denotes a time domain waveform of the on-channel in the V polarization state, $u_{2H}$ denotes a time domain waveform of the neighboring channel in the H polarization state, $u_{2V}$ denotes a time domain waveform of the neighboring channel in the V polarization state, and conj denotes a conjugate operation.

Different from the intra-channel nonlinear noises and the inter-channel nonlinear phase noises, the inter-channel nonlinear crosstalk appears near a frequency to which a pilot signal in an orthogonal polarization state correspond, i.e., near a frequency of the pilot signal in the V polarization state. Hence, the nonlinear crosstalk near the frequency of the pilot signal in the V polarization state results in that estimation of the noise power in the calculation of the optical signal to noise ratio is enlarged, thereby resulting in that the calculated optical signal to noise ratio is inaccurate.

In this embodiment, the selecting unit 101 may select a frequency domain range having a distance from a frequency of the pilot signal greater than or equal to a second threshold value in the frequency domain and take it as the frequency domain range for calculating the noise power of the received signals. For example, the second threshold value may be determined according to an actual situation.

By selecting the frequency domain range far away from the frequency of the pilot signal and take it as the frequency domain range for calculating the noise power of the received signals, influence of inter-channel nonlinear phase noises and nonlinear crosstalk on the calculation of the noise power may be eliminated, thereby improving accuracy of calculating the optical signal to noise ratio.

Figure 5:
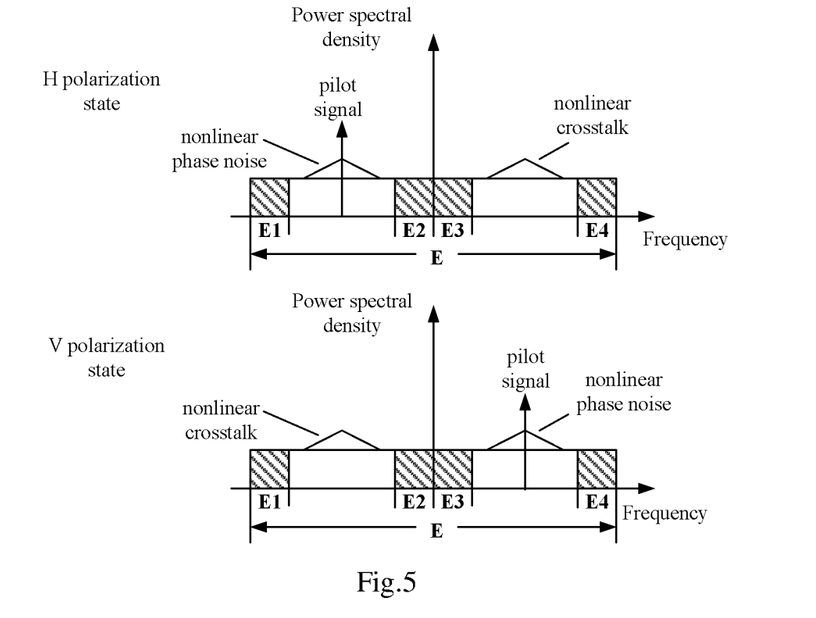
FIG. 5 is a frequency spectrogram of the H polarization state and the V polarization state for which a frequency domain range is selected according to Embodiment 1 of the present disclosure.

FIG. 5 is a frequency spectrogram of the H polarization state and the V polarization state for which a frequency domain range is selected according to Embodiment 1 of the present disclosure. As shown in FIG. 5, for the H polarization state, the inter-channel nonlinear phase noise is near the frequency of the pilot signal in the H polarization state, and the inter-channel nonlinear crosstalk is near the frequency of the pilot signal in the V polarization state; and for the V polarization state, the inter-channel nonlinear phase noise is near the frequency of the pilot signal in the V polarization state, and the inter-channel nonlinear crosstalk is near the frequency of the pilot signal in the H polarization state.

By selecting areas E1, E2, E3 and E4 far away from the frequencies of the pilot signals in the H polarization state and the V polarization state and taking them as frequency domain ranges for calculating the noise power of the received signals, the influence of the inter-channel nonlinear phase noises and nonlinear crosstalk on the calculation of the noise power, and improving accuracy of calculating the optical signal to noise ratio.

In this embodiment, sizes of the frequency domain ranges E1, E2, E3 and E4 are dependent on the distances from the frequency of the pilot signals, and a ratio of a sum of the selected frequency domain ranges E1, E2, E3 and E4 to a whole frequency domain range of the signals may be determined according to an actual situation. For example, the ratio may be determined according to at least one of the number of used pilot signals, a size of dispersion in the received signals or a requirement on calculation precision. For example, if the dispersion in the received signals is relatively small, the ratio may be set to be a relatively large value, i.e., the selected frequency domain ranges are relatively wide.

For example, the ratio of the sum of the selected frequency domain ranges E1, E2, E3 and E4 to the whole frequency domain range E of the signals may be 1/2; however, a value of the ratio is not limited in embodiments of the present disclosure.

In this embodiment, when the nonlinear crosstalk is less than the nonlinear phase noise, the selecting unit 101 may also select a frequency domain range having a distance from a frequency of the pilot signal greater than or equal to the second threshold value in the frequency domain and being at the same side as the frequency of the nonlinear crosstalk of the received signals, and take it as the frequency domain range for calculating the noise power of the received signals.

For example, for the H polarization state, the areas E3 and E4 at the same side as the frequency of the nonlinear crosstalk may be selected as the frequency domain range for calculating the noise power of the received signals; and for the V polarization state, the areas E1 and E2 at the same side as the frequency of the nonlinear crosstalk may be selected as the frequency domain range for calculating the noise power of the received signals.

When the nonlinear crosstalk is less than the nonlinear phase noises, the influence of the nonlinear noises may further be eliminated, by further limiting the frequency domain range for calculating the noise power of the received signals to an area at the same side as the frequency of the nonlinear crosstalk, thereby further improving accuracy of calculating the optical signal to noise ratio.

In this embodiment, when the signals are transmitted in the manner shown in FIG. 2, most of the nonlinear crosstalk may be suppressed, and at this moment, the selecting unit 101 may also select a frequency domain range having a distance from a frequency of the pilot signal greater than or equal to the second threshold value in the frequency domain and being at the same side as the frequency of the nonlinear crosstalk of the received signals, and take it as the frequency domain range for calculating the noise power of the received signals, i.e., the areas E3 and E4 in FIG. 5 are taken as frequency domain ranges for calculating the noise power of the received signals. Thus, the influence of the nonlinear noises may further be eliminated, thereby further improving accuracy of calculating the optical signal to noise ratio.

How to select the time domain range and the frequency domain range for calculating the noise power according to a location of a pilot signal in the time domain and the frequency domain is illustrated above.

In this embodiment, after the selecting unit 101 selects the time domain range and/or the frequency domain range for calculating the noise power of the received signals, the calculating unit 102 calculates the noise power of the received signals according to the received signals in the selected time domain range and/or the frequency domain range, and calculates the optical signal to noise ratio of the received signals according to the noise power. In this embodiment, the noise power and the optical signal to noise ratio may be calculated by using an existing method.

For example, the noise power may be obtained by multiplying a noise power spectral density of the received signals in the above selected time domain range or frequency domain range by a spectral width. As to the calculation for the signal power, the time period of the data signals (payload data) is selected. The reason is as follows. Several optical filters are contained in an optical transmission link, as attenuation of frequency spots where the pilot signals are present is not equal to average loss of the signals, power of the pilot signals at the receiver end is not equal to the power of the signals, and the power obtained through calculation in the time period of the data signals (payload data) is equal to a sum of the signal power and the noise power. Therefore, the signal power may be obtained by combining the above noise power.

In this embodiment, after obtaining the noise power and the signal power of the received signals, following Formula (3), for example, may be used to calculate the optical signal to noise ratio of the received signals:

$$OSNR=10*\log 10(S/n)-10*\log 10(12.5e9/\text{Bandwidth}) \quad (3);$$

where, OSNR denotes the optical signal to noise ratio of the received signals, S denotes the signal power, n denotes the noise power, Bandwidth denotes a signal bandwidth, and 12.5e9 denotes a numerical value used due to that noise power in a bandwidth of 12.5 GHz needs to be reviewed in the calculation of the OSNR; however, the numerical value 12.5e9 may be adjusted according to a particular bandwidth.

In this embodiment, if the pilot signals interpolated into the transmission signals are pilot signals of different frequencies in the two polarization states, noise power and signal power in the two polarization states may be calculated respectively, so as to obtain the optical signal to noise ratios in the two polarization states.

Furthermore, in this embodiment, only the time domain range may be selected in the time domain to calculate the optical signal to noise ratio of the received signals, and only the frequency domain range may also be selected in the frequency domain to calculate the optical signal to noise ratio of the received signals. Furthermore, the selection of the time domain range in the time domain and the selection of the frequency domain range in the frequency domain may be respectively performed to calculate the optical signal to noise ratios of the received signals, and the two optical signal to noise ratios may be averaged, so as to further improve accuracy of calculation.

It can be seen from the above embodiment that the time domain and/or frequency domain range for calculating the noise power are (is) selected according to a location of a pilot signal in the received signals, and the optical signal to noise ratio may be accurately estimated, with a process of calculation being simple and a scope of application being relatively wide.

Embodiment 2

Figure 6:
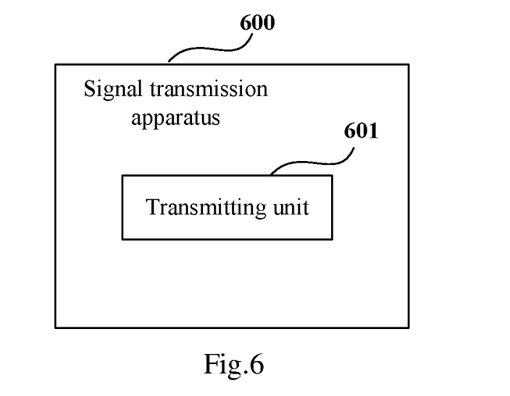
FIG. 6 is a schematic diagram of a structure of the signal transmission apparatus according to Embodiment 2 of the present disclosure.

An embodiment of the present disclosure further provides a signal transmission apparatus, which may be applicable to a transmitter end of a communication system. FIG. 6 is a schematic diagram of a structure of the signal transmission apparatus according to Embodiment 2 of the present disclosure. As shown in FIG. 6, the apparatus 600 includes: a transmitting unit 601; wherein, the transmitting unit 601 is configured to respectively transmit signals in two polarization states; in transmitting each frame of signals, within a time period for transmitting a pilot signal in one polarization state, no signal is transmitted or a direct current optical signal is transmitted in the other polarization state.

For example, the transmitting unit 601 may transmit the signals in the manner shown in FIG. 2 according to Embodiment 1, and a particular manner of transmission is identical to that according to Embodiment 1, which shall not be described herein any further.

It can be seen from the above embodiment that in transmitting each frame of signals, within a time period for transmitting a pilot signal in one polarization state, no signal is transmitted or a direct current optical signal is transmitted in the other polarization state, which may suppress most of nonlinear crosstalk, thereby effectively eliminating influence of nonlinear crosstalk on calculation of noise power, and improving accuracy of calculating the optical signal to noise ratio.

Embodiment 3

Figure 7:
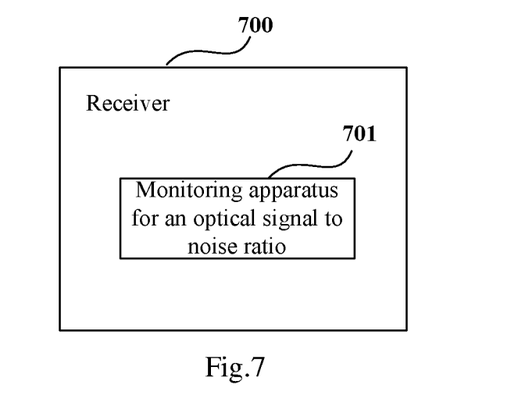
FIG. 7 is a schematic diagram of a structure of the receiver according to Embodiment 3 of the present disclosure.

An embodiment of the present disclosure further provides a receiver. FIG. 7 is a schematic diagram of a structure of the receiver according to this embodiment. As shown in FIG. 7, the receiver 700 includes a monitoring apparatus 701 for an optical signal to noise ratio, functions and a structure of the monitoring apparatus 701 for an optical signal to noise ratio being identical to those according to Embodiment 1, and being not going to be described herein any further.

Figure 8:
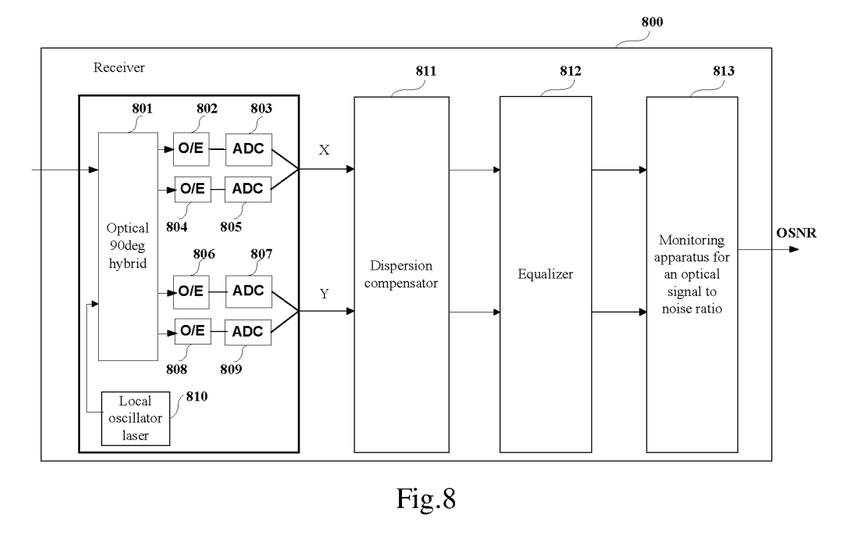
FIG. 8 is a block diagram of a systematic structure of the receiver according to Embodiment 3 of the present disclosure.

FIG. 8 is a block diagram of a systematic structure of the receiver according to Embodiment 3 of the present disclosure. As shown in FIG. 8, the receiver 800 includes a front end, configured to convert inputted optical signals into baseband signals in two polarization states. In embodiments of the present disclosure, the two polarization states may include an H polarization state and a V polarization state.

As shown in FIG. 8, the front end includes: a local oscillator laser 810, an optical 90 deg hybrid 801, optoelectronic (O/E) detectors 802, 804, 806 and 808, analog-to-digital converters (ADCs) 803, 805, 807 and 809, a dispersion compensator 811, an equalizer 812 and a monitoring apparatus 813 for an optical signal to noise ratio; a structure and functions of the monitoring apparatus 813 for an optical signal to noise ratio is identical to those according to Embodiment 1, and shall not be described herein any further; the oscillator laser 810 is configured to provide a local light source, and optical signals are converted into baseband signals in one polarization state after passing through the optical 90 deg hybrid 801, the optoelectronic (O/E) detectors 802 and 804, and the analog-to-digital converters (ADCs) 803 and 805; the optical signals are converted into baseband signals in the other polarization state after passing through the optical 90 deg hybrid 801, the optoelectronic (O/E) detectors 806 and 808, and the analog-to-digital converters (ADCs) 807 and 809; and a particular process of implementation is similar to that in the prior art, and shall not be described herein any further.

Furthermore, if a frequency difference and a phase noise have effect on estimation of an OSNR, the receiver 800 may further include a frequency difference compensator and a phase noise compensator (not shown in FIG. 8).

It can be seen from the above embodiment that the time domain and/or frequency domain range for calculating the noise power are (is) selected according to a location of a pilot signal in the received signals, and the optical signal to noise ratio may be accurately estimated, with a process of calculation being simple and a scope of application being relatively wide.

Embodiment 4

Figure 9:
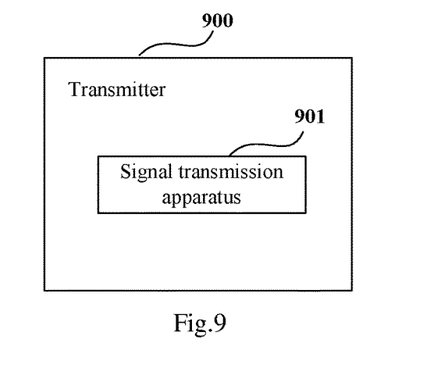
FIG. 9 is a schematic diagram of a structure of the transmitter according to Embodiment 4 of the present disclosure.

An embodiment of the present disclosure further provides a transmitter. FIG. 9 is a schematic diagram of a structure of the transmitter according to this embodiment. As shown in FIG. 9, the transmitter 900 includes a signal transmission apparatus 901, functions and a structure of the signal transmission apparatus 901 being identical to those according to Embodiment 2, and being not going to be described herein any further.

Figure 10:
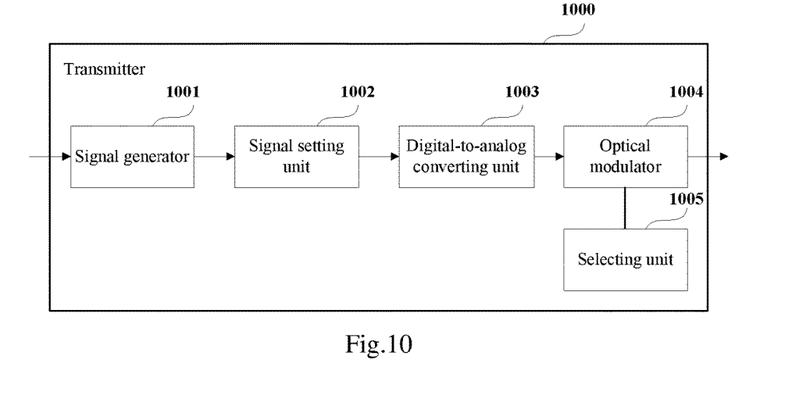
FIG. 10 is a block diagram of a systematic structure of the transmitter according to Embodiment 4 of the present disclosure.

FIG. 10 is a block diagram of a systematic structure of the transmitter of Embodiment 4 of the present disclosure. As shown in FIG. 10, the transmitter 1000 includes: a signal generator 1001, a signal setting unit 1002, a digital-to-analog converting unit 1003 and an optical modulator 1004; wherein, the signal generator 1001 generates digital signals according to transmission data, the signal setting unit 1002 sets pilot signals in the generated digital signals in the manner according to Embodiment 2, i.e., in transmitting each frame of signals, within a time period for transmitting a pilot signal in one polarization state, no signal is transmitted or a direct current optical signal is transmitted in the other polarization state; the digital-to-analog converting unit 1003 performs digital-to-analog conversion on the digital signals; and the optical modulator 1004 modulates light by taking the signals converted by the digital-to-analog converting unit 1003 as modulation signals; furthermore, a selecting unit 1005 may be included, and the optical modulator 1004 performs signal modulation according to codewords selected by the selecting unit 1005, so that frequencies of pilot signals in different polarization states are different.

It can be seen from the above embodiment that in transmitting each frame of signals, within a time period for transmitting a pilot signal in one polarization state, no signal is transmitted or a direct current optical signal is transmitted in the other polarization state, which may suppress most of nonlinear crosstalk, thereby effectively eliminating influence of nonlinear crosstalk on calculation of noise power, and improving accuracy of calculating the optical signal to noise ratio.

Embodiment 5

Figure 11:
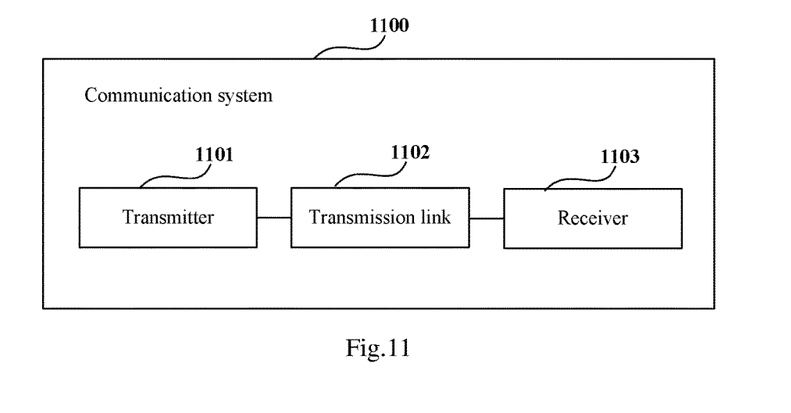
FIG. 11 is a schematic diagram of a structure of the communication system according to Embodiment 5 of the present disclosure.

An embodiment of the present disclosure further provides a communication system. FIG. 11 is a schematic diagram of a structure of the communication system according to this embodiment. As shown in FIG. 11, the communication system 1100 includes a transmitter 1101, a transmission link 1102 and a receiver 1103; wherein, a structure and functions of the transmitter 1101 is identical to those according to Embodiment 4, and a structure and functions of the receiver 1103 is identical to those according to Embodiment 3, which shall not be described herein any further. And the transmission link 1102 may have a structure and functions of an existing transmission link, and a structure and functions of the transmission link is not limited in the embodiment of the present disclosure.

It can be seen from the above embodiment that the time domain and/or frequency domain range for calculating the noise power are (is) selected according to a location of a pilot signal in the received signals, and the optical signal to noise ratio may be accurately estimated, with a process of calculation being simple and a scope of application being relatively wide.

And in transmitting each frame of signals, within a time period for transmitting a pilot signal in one polarization state, no signal is transmitted or a direct current optical signal is transmitted in the other polarization state, which may suppress most of nonlinear crosstalk, thereby effectively eliminating influence of nonlinear crosstalk on calculation of noise power, and improving accuracy of calculating the optical signal to noise ratio.

Embodiment 6

Figure 12:
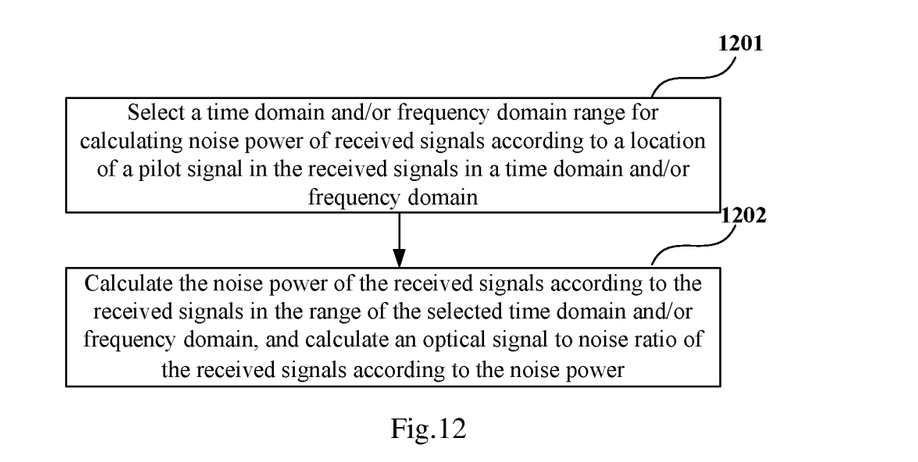
FIG. 12 is a flowchart of the monitoring method for an optical signal to noise ratio according to Embodiment 6 of the present disclosure.

An embodiment of the present disclosure further provides a monitoring method for an optical signal to noise ratio, corresponding to the monitoring apparatus for an optical signal to noise ratio according to Embodiment 1. FIG. 12 is a flowchart of the monitoring method for an optical signal to noise ratio according to this embodiment. As shown in FIG. 12, the method includes Step 1201: selecting a time domain and/or frequency domain range for calculating noise power of received signals according to a location of a pilot signal in the received signals in a time domain and/or frequency domain.

The method includes Step 1202: calculating the noise power of the received signals according to the received signals in the range of the selected time domain and/or frequency domain, and calculating an optical signal to noise ratio of the received signals according to the noise power.

In this embodiment, how to select the time domain and/or frequency domain range for calculating the noise power of the received signals and calculate the optical signal to noise ratio according to the selected range are identical to those according to Embodiment 1, and shall not be described herein any further.

It can be seen from the above embodiment that the time domain and/or frequency domain range for calculating the noise power are (is) selected according to a location of a pilot signal in the received signals, and the optical signal to noise ratio may be accurately estimated, with a process of calculation being simple and a scope of application being relatively wide.

Embodiment 7

Figure 13:
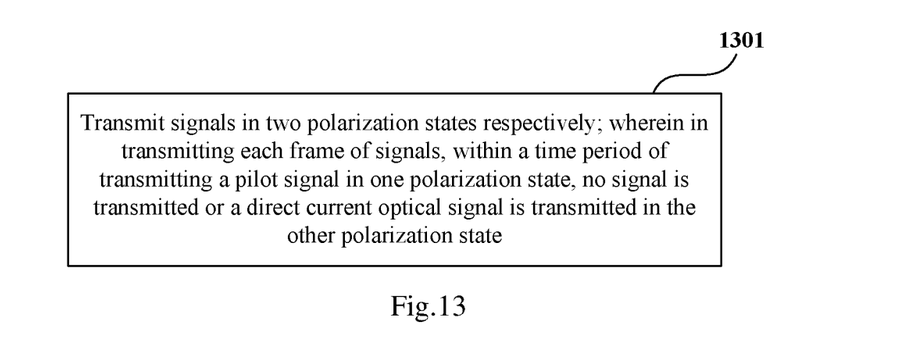
FIG. 13 is a flowchart of the signal transmission method according to Embodiment 7 of the present disclosure.

An embodiment of the present disclosure further provides a signal transmission method, corresponding to the signal transmission apparatus according to Embodiment 2. FIG. 13 is a flowchart of the signal transmission method according to this embodiment. As shown in FIG. 13, the method includes Step 1301: transmitting signals in two polarization states respectively; wherein in transmitting each frame of signals, within a time period for transmitting a pilot signal in one polarization state, no signal is transmitted or a direct current optical signal is transmitted in the other polarization state.

In this embodiment, the method for transmitting signals in two polarization states respectively is identical to that according to Embodiment 2, and shall not be described herein any further.

It can be seen from the above embodiment that in transmitting each frame of signals, within a time period for transmitting a pilot signal in one polarization state, no signal is transmitted or a direct current optical signal is transmitted in the other polarization state, which may suppress most of nonlinear crosstalk, thereby effectively eliminating influence of nonlinear crosstalk on calculation of noise power, and improving accuracy of calculating the optical signal to noise ratio.

An embodiment of the present disclosure further provides a computer-readable program, wherein when the program is executed in a monitoring apparatus for an optical signal to noise ratio or a receiver, the program enables a computer to carry out the monitoring method for an optical signal to noise ratio according to Embodiment 6 in the monitoring apparatus for an optical signal to noise ratio or the receiver.

An embodiment of the present disclosure further provides a computer-readable program, wherein when the program is executed in a signal transmission apparatus or a transmitter, the program enables a computer to carry out the signal transmission method according to Embodiment 7 in the signal transmission apparatus or the transmitter.

An embodiment of the present disclosure further provides a storage medium in which a computer readable program is stored, wherein the computer readable program enables a computer to carry out the monitoring method for an optical signal to noise ratio according to Embodiment 6 in a monitoring apparatus for an optical signal to noise ratio or a receiver.

An embodiment of the present disclosure further provides a storage medium which stores a computer readable program, wherein the computer readable program enables a computer to carry out the signal transmission method according to Embodiment 7 in a signal transmission apparatus or a transmitter.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principles of the present disclosure, and such variants and modifications fall within the scope of the present disclosure.

For the implementation of the present disclosure containing the above embodiments, following supplements are further disclosed.

Supplement 1. A monitoring apparatus for an optical signal to noise ratio, including a selecting unit configured to select a time domain and/or frequency domain range for calculating noise power of received signals according to a location of a pilot signal in the received signals in a time domain and/or frequency domain; and a calculating unit configured to calculate the noise power of the received signals according to the received signals in the selected range of the time domain and/or frequency domain, and calculate an optical signal to noise ratio of the received signals according to the noise power.

Supplement 2. The apparatus according to supplement 1, wherein the selecting unit is configured to select a time domain range having a distance from a center of the pilot signal less than or equal to a first threshold value in the time domain, and take it as the time domain range for calculating the noise power of the received signals.

Supplement 3. The apparatus according to supplement 1, wherein the selecting unit is configured to select a frequency domain range having a distance from a frequency of the pilot signal greater than or equal to a second threshold value in the frequency domain, and take it as the frequency domain range for calculating the noise power of the received signals.

Supplement 4. The apparatus according to supplement 3, wherein the selecting unit is configured to select a frequency domain range having a distance from a frequency of the pilot signal greater than or equal to a second threshold value in the frequency domain and being at the same side as a frequency of nonlinear crosstalk of the received signals, and take it as the frequency domain range for calculating the noise power of the received signals.

Supplement 5. The apparatus according to supplement 1, wherein, the received signals are transmitted in a manner as follows: respectively transmitting signals in two polarization states; wherein in transmitting each frame of signals, within a time period for transmitting a pilot signal in one polarization state, no signal is transmitted or a direct current optical signal is transmitted in the other polarization state.

Supplement 6. A signal transmission apparatus, including a transmitting unit configured to respectively transmit signals in two polarization states; wherein in transmitting each frame of signals, within a time period for transmitting a pilot signal in one polarization state, no signal is transmitted or a direct current optical signal is transmitted in the other polarization state.

Supplement 7. A receiver, including the apparatus as described in any one of supplements 1-5.

Supplement 8. A transmitter, including the apparatus as described in supplement 6.

Supplement 9. A communication system, including the receiver as described in supplement 7 and the transmitter as described in supplement 8.

Supplement 10. A monitoring method for an optical signal to noise ratio, including selecting a time domain and/or frequency domain range for calculating noise power of received signals according to a location of a pilot signal in the received signals in a time domain and/or frequency domain; and calculating the noise power of the received signals according to the received signals in the selected range of the time domain and/or frequency domain, and calculating an optical signal to noise ratio of the received signals according to the noise power.

Supplement 11. The method according to supplement 10, wherein the calculating a time domain range for calculating noise power of received signals according to a location of a pilot signal in the received signals in a time domain includes selecting a time domain range having a distance from a center of the pilot signal less than or equal to a first threshold value in the time domain, and take it as the time domain range for calculating the noise power of the received signals.

Supplement 12. The method according to supplement 10, wherein the calculating a frequency domain range for calculating noise power of received signals according to a location of a pilot signal in the received signals in a frequency domain includes selecting a frequency domain range having a distance from a frequency of the pilot signal greater than or equal to a second threshold value in the frequency domain, and taking it as the frequency domain range for calculating the noise power of the received signals.

Supplement 13. The method according to supplement 12, wherein the selecting a frequency domain range having a distance from a frequency of the pilot signal greater than or equal to a second threshold value in the frequency domain, and taking it as the frequency domain range for calculating the noise power of the received signals includes selecting a frequency domain range having a distance from a frequency of the pilot signal greater than or equal to a second threshold value in the frequency domain and being at the same side as a frequency of nonlinear crosstalk of the received signals, and take it as the frequency domain range for calculating the noise power of the received signals.

Supplement 14. The method according to supplement 10, wherein, the received signals are transmitted in a manner as follows: respectively transmitting signals in two polarization states; wherein in transmitting each frame of signals, within a time period for transmitting a pilot signal in one polarization state, no signal is transmitted or a direct current optical signal is transmitted in the other polarization state.

Supplement 15. A signal transmission method, including respectively transmitting signals in two polarization states; wherein in transmitting each frame of signals, within a time period for transmitting a pilot signal in one polarization state, no signal is transmitted or a direct current optical signal is transmitted in the other polarization state.

While the present disclosure has been particularly shown and described with reference to embodiments thereof, it will be understood by those of ordinary skill in the art that various changes in form and details may be made therein without departing from the spirit and scope of the present disclosure as defined by the following claims.

What is claimed is:

1. A monitoring apparatus for an optical signal to noise ratio, comprising:
   a memory that stores a plurality of instructions; and
   a processor coupled to the memory and configured to execute the instructions to:
   select a range of at least one of a time domain and frequency domain for calculating noise power of received signals according to a location of a pilot signal in the received signals in the at least one of the time domain and the frequency domain; and
   calculate the noise power of the received signals according to the received signals in the selected range of the at least one of the time domain and frequency domain, and calculate an optical signal to noise ratio of the received signals according to the noise power, and
   wherein one of:
   the processor is configured to execute the instructions to select a time domain range having a distance from a center of the pilot signal less than or equal to a first threshold value in the time domain, and calculate the noise power of the received signals according to the selected time domain range, and
   the processor is configured to execute the instructions to select a frequency domain range having a distance from a frequency of the pilot signal greater than or equal to a second threshold value in the frequency domain, and calculate the noise power of the received signals according to the selected frequency domain range.

2. The apparatus according to claim 1, wherein the processor is configured to execute the instructions to selects the frequency domain range as being at the same side relative to zero as a frequency of nonlinear crosstalk of the received signals, and calculates the noise power of the received signals according to the selected frequency domain range.

3. The apparatus according to claim 1, wherein the received signals are respectively transmitted in two polarization states,
   wherein in transmitting each frame of the received signals, within a time period for transmitting a pilot signal in one polarization state, no signal is transmitted or a direct current optical signal is transmitted in the other polarization state.

4. A receiver, comprising:
a monitoring apparatus including:
a memory that stores a plurality of instructions; and
a processor coupled to the memory and configured to execute the instructions to:
   select a range of at least one of a time domain and frequency domain for calculating noise power of received signals according to a location of a pilot signal in the received signals in the at least one of the time domain and the frequency domain; and
calculate the noise power of the received signals according to the received signals in the selected range of the at least one of the time domain and frequency domain, and calculate an optical signal to noise ratio of the received signals according to the noise power, and
wherein one of:
the processor is configured to execute the instructions to select a time domain range having a distance from a center of the pilot signal less than or equal to a first threshold value in the time domain, and calculate the noise power of the received signals according to the selected time domain range, and
the processor is configured to execute the instructions to select a frequency domain range having a distance from a frequency of the pilot signal greater than or equal to a second threshold value in the frequency domain, and calculate the noise power of the received signals according to the selected frequency domain range.

* * * * *